United States Patent
Bailey et al.

(10) Patent No.: US 12,034,562 B2
(45) Date of Patent: Jul. 9, 2024

(54) SYSTEMS, METHODS, COMPUTER-READABLE MEDIA, AND DEVICES FOR AUTHENTICATING USERS

(71) Applicant: MASTERCARD TECHNOLOGIES CANADA ULC, Vancouver (CA)

(72) Inventors: Christopher Bailey, Langley (CA); John Hearty, Vancouver (CA); Ryan Brough, North Vancouver (CA); Robert W. Capps, II, Concord, CA (US); David J. Senci, Troy, IL (US)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 17/564,371

(22) Filed: Dec. 29, 2021

(65) Prior Publication Data
US 2022/0209978 A1 Jun. 30, 2022

Related U.S. Application Data

(60) Provisional application No. 63/132,134, filed on Dec. 30, 2020.

(51) Int. Cl.
*H04L 12/28* (2006.01)

(52) U.S. Cl.
CPC .......... *H04L 12/282* (2013.01); *H04L 12/281* (2013.01); *H04L 12/2838* (2013.01); *H04L 2012/285* (2013.01)

(58) Field of Classification Search
CPC . H04L 12/282; H04L 12/281; H04L 12/2838; H04L 2012/285; H04L 12/2829; H04L 12/2825
See application file for complete search history.

(56) References Cited

U.S. PATENT DOCUMENTS

| 9,426,185 B1* | 8/2016 | Vora .................. H04L 63/0492 |
| 2007/0278291 A1 | 12/2007 | Rans et al. |

(Continued)

FOREIGN PATENT DOCUMENTS

| CN | 110932591 A | 3/2020 |
| WO | 2016201811 A1 | 12/2016 |
| WO | 2017016065 A1 | 2/2017 |

OTHER PUBLICATIONS

International Search Report and Written Opinion for Application No. PCT/CA2021/051896 dated Mar. 22, 2022 (11 pages).

*Primary Examiner* — Charles R Kasenge
(74) *Attorney, Agent, or Firm* — Michael Best & Friedrich LLP

(57) ABSTRACT

Embodiment described herein provide a system for authenticating an identity of a user. The system includes a first device, a second device, a user device, and a remote computing device. The first device, the second device, and the user device are connected to and operable to communicate over the first communications network. The user device is connected to and operable to communicate over a second communications network. The user device is configured to detect the first device or the second device when the first device or the second device is connected the first communications network, and to generate one or more signals related to the detection of the first device or the second device. The remote computing device is configured to receive the one or more signals from the user device and authenticate the identity of the user based on the one or more signals.

20 Claims, 6 Drawing Sheets

(56) References Cited

U.S. PATENT DOCUMENTS

| | | |
|---|---|---|
| 2012/0238207 A1 | 9/2012 | Marcovecchio et al. |
| 2013/0030997 A1 | 1/2013 | Spodak et al. |
| 2014/0180968 A1* | 6/2014 | Song ................... G06Q 50/06 340/870.03 |
| 2016/0380809 A1* | 12/2016 | Hou .................. H04L 63/0428 370/254 |
| 2017/0031337 A1* | 2/2017 | Jablokov .............. G05D 7/0635 |
| 2017/0249135 A1* | 8/2017 | Gandhi ............... H04L 63/0492 |
| 2018/0321652 A1* | 11/2018 | Jablokov .............. G05B 19/042 |
| 2019/0007949 A1* | 1/2019 | Myers, III .......... H04W 36/165 |
| 2019/0362333 A1* | 11/2019 | Agarwal .............. G06Q 20/308 |
| 2020/0067916 A1* | 2/2020 | Spates, IV .......... G06F 16/2379 |
| 2020/0228527 A1* | 7/2020 | Lu ......................... H04L 12/283 |
| 2020/0275546 A1* | 8/2020 | Marshal ................ H04W 12/06 |
| 2021/0377360 A1* | 12/2021 | Sundaram ........... H04L 12/2803 |

\* cited by examiner

SYSTEMS, METHODS, COMPUTER-READABLE MEDIA, AND DEVICES FOR AUTHENTICATING USERS

CROSS-REFERENCE TO RELATED APPLICATION

This application claims priority to, and the benefit of, U.S. Provisional Application No. 63/132,134, filed on Dec. 30, 2020, the entire contents of which is incorporated herein by reference.

FIELD OF THE INVENTION

Aspects of the present disclosure relate to systems, methods, computer-readable media, and devices for authenticating users.

BACKGROUND

A large organization with an online presence often receives tens of thousands of requests per minute to initiate digital interactions. A security system supporting multiple large organizations may handle millions of digital interactions at the same time, and the total number of digital interactions analyzed by the security system each week may easily exceed one billion. As organizations increasingly demand real time results, a security system may have to analyze a large amount of data and accurately determine whether a digital interaction is legitimate, all within fractions of a second. This presents tremendous technical challenges related to the validation or authentication of a user's identity, especially given the large overall volume of digital interactions handled by the security system.

For example, when a user initiates a digital interaction with an online system (e.g., via a web page or a mobile device app), the online system (e.g., a remote computing device, a server, etc.) may prompt the user to provide one or more pieces of information to identify the user to the online system. Examples of identification information include, but are not limited to, name, account identifier, phone number, credit card number, driver's license number, social security number, date of birth, billing address, shipping address, etc. Additionally, or alternatively, the online system may prompt the user to provide one or more pieces of information, and/or to perform one or more tasks, to prove to the online system that the user is indeed who he/she claims to be. Examples of authentication information include, but are not limited to, password, answer to security question, etc. Examples of authentication tasks include, but are not limited to, scanning an anatomical feature (e.g., fingerprint, face, iris, etc.), speaking an utterance, typing a phrase, selecting one or more images from an array of images, etc. If the online system determines that the user has satisfactorily authenticated himself/herself, the online system may allow the user to take one or more desired actions (e.g., accessing a web page, posting a message, making a purchase, etc.).

An online system may validate identification and/or authentication information provided by a user in many different ways. For instance, the online system many determine whether a user name and/or a password entered by the user conform to one or more expected parameters (e.g., minimum number of characters, absence or presence of certain characters, etc.). Additionally, or alternatively, the online system may verify whether the identification and/or authentication information provided by the user match a particular user known to the online system. For instance, the online system many determine whether the user name entered by the user has an associated record in the online system's database, and/or whether the password entered by the user and a password stored in the online system's database, when combined with a same salt, hash to a same value.

Validation and verification, as discussed above, may not necessarily produce a reliable authentication result. For instance, an entity logging in with John Smith's user name and password may not actually be John Smith. Instead, the entity may be a bot attempting to gain access using stolen credentials, or a person with whom John Smith has shared his user name and password.

Some online systems use multifactor authentication to determine whether to grant access to a user. For example, in addition to, or instead of, requiring a user to submit something the user knows (e.g., a password), an online system may require the user to demonstrate that the user also has something (e.g., a hardware token). However, such an approach may still fail to positively identify a user. For instance, the online system may mistakenly authenticate a person as John Smith if that person has stolen John Smith's password and hardware token. Also, the use of a special purpose hardware token may create undesirable user experience friction. For example, a legitimate user may be unable to gain access if the hardware token is misplaced.

SUMMARY

Embodiments described herein provide various combinations of active and passive authentication techniques that may be employed to authenticate a user. For example, data or information can be gathered from a variety of devices associated with or in proximity to a user's device (e.g., by probing for devices connected to a network). Based on the data or information from one or more of these devices, and employing active, passive, or a combination of active and passive authentication techniques in relation to the one or more devices, the user can be authenticated. In this way, passive authentication techniques, for example, can be employed that are less intrusive than multifactor authentication, and therefore may improve user experience. Passive authentication techniques may be more difficult for an attacker to detect, and thus more effective. For instance, in some embodiments, different types of passive behavior monitoring may be dynamically selected for deployment, so that an attack does not know a priori which type of monitoring will be used. In this manner, even if the attacker is able to spoof a certain type of behavior, the attacker may have a low likelihood of success. This may force an attacker to spoof multiple types of behavior, which may make launching an attack uneconomical.

Embodiments described herein provide a system for authenticating an identity of a user. The system includes a first device of a first device type, a second device of a second device type, a user device, and a remote computing device. The first device is connected to and operable to communicate over a first communications network. The second device is connected to and operable to communicate over the first communications network. The user device is connected to and operable to communicate over the first communications network. The user device is also connected to and operable to communicate over a second communications network. The user device is configured to detect the first device when the first device is connected the first communications network, detect the second device when the second device is connected to the first communications network, and generate one or more signals related to the detection of the first device on the first communications network and the detection of the second device on the first communications network. The remote computing device is connected to and operable to communicate over the second communications network with the user device. The remote computing device is configured to receive the one or more signals from the user device and authenticate the identity of the user based on the one or more signals from the user device.

Embodiments described herein provide a system for authenticating an identity of a user. The system includes a device, a user device, and a remote computing device. The device is connected to and operable to communicate over a first communications network. The user device is connected to and operable to communicate over the first communications network. The user device is also connected to and operable to communicate over a second communications network. The user device is configured to detect the device when the device is connected to the first communications network, and generate one or more signals related to the detection of the first device on the first communications network. The remote computing device is connected to and operable to communicate over the second communications network with the user device. The remote computing device is configured to receive the one or more signals from the user device. The remote computing device is configured to authenticate the identity of the user based on the one or more signals from the user device.

Embodiments described herein provide a method for authenticating an identity of a user. The method includes detecting, with a user device, a first device when the first device is connected to a first communications network. The method includes detecting, with the user device, a second device when the second device is connected to the first communications network. The method includes generating, with the user device, one or more signals related to the detection of the first device on the first communications network and the detection of the second device on the first communications network. The method includes transmitting, with the user device, the one or more signals to a remote computing device via a second communications network. The method also includes receiving, with the user device, an authentication of the identity of user from the remote computing device via the second communications network.

DETAILED DESCRIPTION

Figure 1A:
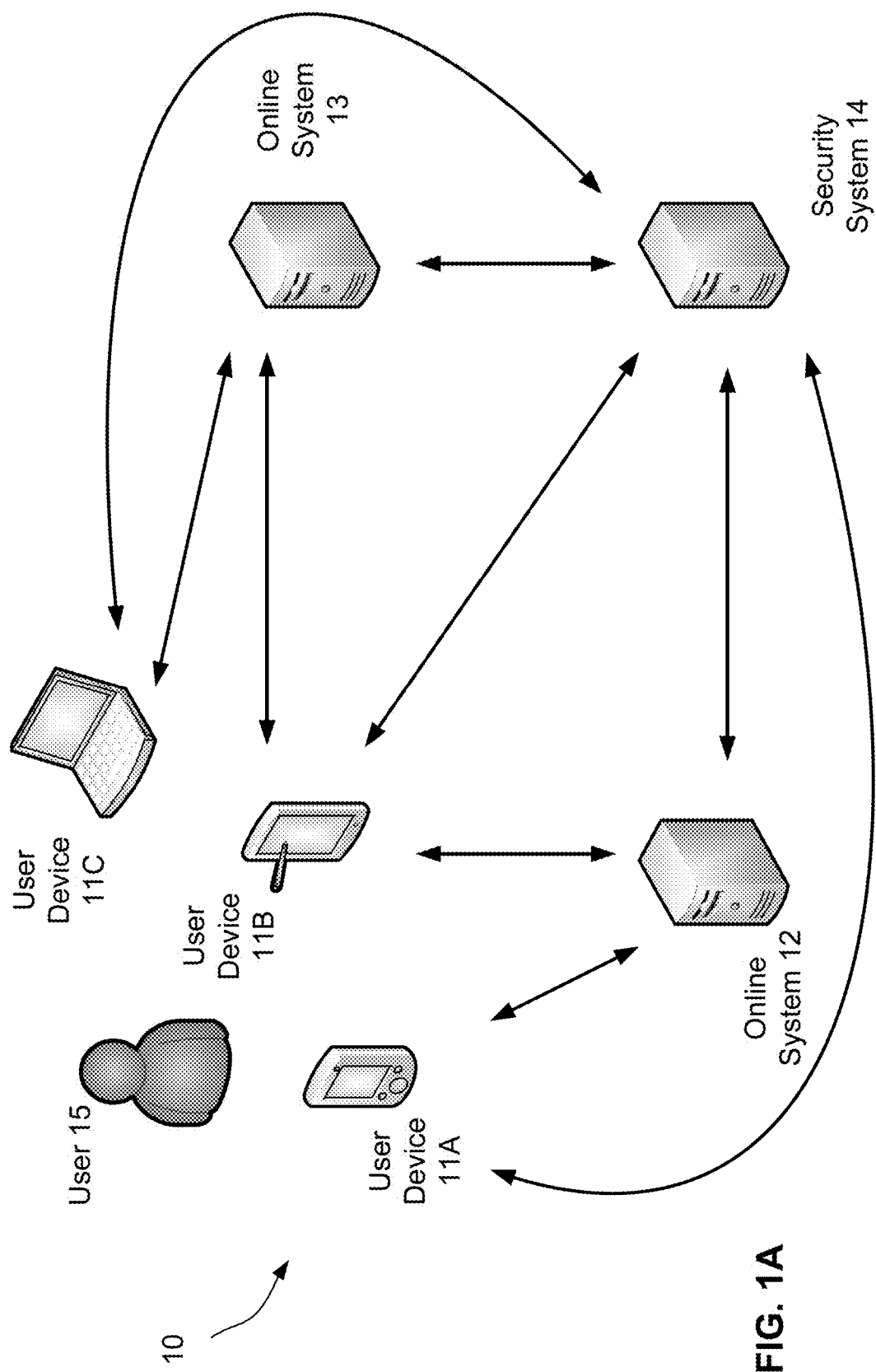
FIG. 1A shows an illustrative system 10 via which digital interactions may take place, in accordance with some embodiments.

Embodiments described herein provide various combinations of active and passive authentication techniques that may be employed to authenticate a user. For example, data or information can be gathered from a variety of devices associated with or in proximity to a user's device (e.g., by probing for devices connected to a network). Based on the data or information from one or more of these devices, and employing active, passive, or a combination of active and passive authentication techniques in relation to the one or more devices, the user can be authenticated. As an illustrative example, a user's device (e.g., a mobile phone, tablet, etc.) may be in proximity to one or more additional devices or operate on the same network as one or more additional devices. These one or more additional devices gather or transmit information about how the devices are being used, the status of the devices, the location of the devices, etc. The user's device can receive or gather this information passively without the user needing to actively input any information (e.g., due to unencrypted communication over a network), or the user's device actively communicates with the devices. For example, signal strength to the hub based on Wi-Fi and Bluetooth, what current devices are connected, when was the last time the current devices were used, whether any significant settings on the current devices has changed. Each personal area network may have a history built up so if significant things change passively (without prompting the user), the user's device may record these changes.

These devices can be used to generate or create an environmental fingerprint for the user and the user's device. The environmental fingerprint, for example, would include information about the devices in proximity to the user's device or operating over the same network as the user's device. In a home setting, the environmental fingerprint could include a variety of devices that communicate over a home WiFi network (e.g., smart refrigerator, smart TV, smart thermostat, smart lightbulbs, or other suitable smart device). Knowing or predicting the precise configuration of all the devices that would have such a relationship to the user's device would be very difficult.

Additionally or alternatively to passively gathering information from the devices, one or more of the devices in proximity to the user's device or operating on the same network as the user's device can be actively or dynamically probed in order to gather additional information about the environment around the user's device (e.g., assuming any required permission for communicating with or controlling the devices has been given). For example, a user could be prompted to turn a smart lightbulb ON or OFF, and the smart lightbulb being turned ON or turned OFF can be detected based on information the smart lightbulb sends to the network. A distance between devices or proximity among multiple devices can also be included in the environmental fingerprint. Authentication of the user based on these devices can be achieved using any combination of such devices and such techniques. The considerable number of combinations of devices the can be included in an environmental fingerprint associated with a user's device and/or actively probed makes the likelihood of accurately and successfully mimicking the user's device extremely difficult. As a result of this difficulty, if a user is authenticated based on an environmental fingerprint, active probing, or some combination of the two, the likelihood that the authentication is incorrect is low. In some embodiments, a confidence level in the authentication can be based on weights associated with how frequently a device is identified in the environment of the user's device. For example, if a smart refrigerator is identified in the environment of the user's device and operating on the user's home network each day for a year, the presence or absence of the smart refrigerator on the user's home network could carry significant weight regarding whether the user is able to be authenticated. Each of these techniques for authenticating a user is described in greater detail below.

In some embodiments, passive behavior monitoring may be performed across multiple devices since mobile and/or wearable devices can provide multiple streams of data that may be analyzed to increase confidence that a user is indeed who he/she claims to be. For instance, data received from a sensor of a wearable device (e.g., an accelerometer of a smartwatch) may be analyzed in conjunction with data received from another device (e.g., a keyboard, which may be a virtual keyboard on a smart device, or a physical keyboard) to look for evidence of spoofing. In addition, monitoring interrelationships between these multiple independent sources may provide even higher level of confidence in authenticating a user. For instance, accelerometer data from a user's smartwatch may be analyzed to determine if the user's hand motion is consistent with timing of keystrokes captured by a virtual keyboard of the user's smart phone. A match may indicate that an entity attempting to log in is wearing the user's smartwatch and typing on the user's smart phone. This may provide a stronger guarantee that the entity is indeed the user while also presenting a new and significant challenge for malware due to the increased difficulty of correctly replicating attributes from additional associated devices whose existence or nature may not be known to the attacker.

As indicated, in embodiments, connected devices that are in a user's physical environment may be used to authenticate the user, in addition to, or instead of, devices worn or carried by the user. For instance, in some embodiments, one or more software agents may be deployed to a user application to collect information about a user's physical environment. Such cross-device information may be correlated either in transmission and sent as added contextual information from a single device, or sent from multiple devices and correlated retroactively using common identification keys. Such cross-device information may be used to create an environment fingerprint, which may indicate which connected devices are visible from a digital perspective, such as wirelessly connected devices (e.g., wireless keyboard, mouse, printer, etc.) and/or Internet of Things (IoT) devices (e.g., light switches, locks, appliances, etc.). In this manner, an attack may be detected by checking whether one or more of the connected devices in the environment fingerprint are indeed present.

While it may be challenging to spoof a legitimate user's environment fingerprint, an attacker may have sufficient motivation to do so against a high value target. Accordingly, in some embodiments, enhanced security may be provided by dynamically probing one or more connected devices. For instance, a security system may authenticate a user by dynamically attempting to induce one or more changes in the user's physical environment and verifying that the one or more changes have actually occurred. As an example, a user device engaging in a digital interaction may submit information that suggests the user device is located in the user's home (e.g., a device identifier associated with the user's home computer, an IP address associated with the user's home router, etc.). To verify the user device's location, the security system may modify a setting of a connected device (e.g., a thermostat) in the user's home environment, for example, by issuing a command for which permission has been previously granted (e.g., when the user enrolled with the security system). The security system may request that the user device read the setting of the connected device and return the read value to the security system for verification. The security system may then reset the setting to its previous value. Or, for example, another device in that environment is asked to read the setting value and return it as a confirmation. Encrypted communication channels between devices render the request and response unknown to an attacker, proving that the login originates from a device which is authorized to communicate with other devices in the end user local environment.

As another example, the security system may request that an entity initiating a digital interaction perform an action that may only be performed from the user's physical environment. For instance, the entity may be requested to turn a certain light switch on and off physically, and the security system may check data received from the light switch to confirm that the entity indeed has access to the user's physical environment.

As yet another example, the proximity between devices may also be used to authenticate a user. For instance, in some embodiments, a security system may request that a user device (e.g., a mobile phone or a tablet computer) initiating a digital interaction demonstrate that a credit card to be used in the digital interaction is in close proximity to the user device. Thus, an entity engaging in the digital interaction may be requested to hold the credit card sufficiently close to the user device to allow the user device to send and/or receive information from the credit card, for instance, via Radio Frequency Identification (RFID), Near Field Communication (NFC), or some other suitable communication protocol. In the case of RFID a radio frequency emission from a powered emitter device provides power to a specialized, unpowered chip in the credit card, prompting a response from the chip. This response includes card balance information and card identification information, the latter of which becomes an identifier that demonstrates the specific card's proximity to the user device.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

FIG. 1A shows an illustrative system 10 via which digital interactions may take place, in accordance with some embodiments. In this example, the system 10 includes user devices 11A-C, online systems 12 and 13 (e.g., servers, remote computation devices, etc.), and a security system 14 (e.g., one or more servers, one or more remote computation devices, etc.). A user 15 may use the user devices 11A-C to engage in digital interactions. For instance, the user device 11A may be a smart phone and may be used by the user 15 to check email and download music, the user device 11B may be a tablet computer and may be used by the user 15 to shop and bank, and the user device 11C may be a laptop computer and may be used by the user 15 to watch TV and play games.

It should be appreciated that the user 15 may engage in other types of digital interactions in addition to, or instead of, those mentioned above, as aspects of the present disclosure are not limited to the analysis of any particular type of digital interactions. Also, digital interactions are not limited to interactions that are conducted via an Internet connection.

For example, a digital interaction may involve an ATM transaction over a leased telephone line.

Furthermore, it should be appreciated that the particular combination of user devices 11A-C is provided solely for purposes of illustration, as the user 15 may use any suitable device or combination of devices to engage in digital interactions, and the user may use different devices to engage in a same type of digital interactions (e.g., checking email).

In some embodiments, a digital interaction may involve an interaction between the user 15 and an online system, such as the online system 12 or the online system 13. For instance, the online system 12 may include an application server that hosts a backend of a banking app used by the user 15, and the online system 13 may include a web server that hosts a retailer's web site that the user 15 visits using a web browser. It should be appreciated that the user 15 may interact with other online systems (not shown) in addition to, or instead of the online systems 12 and 13. For example, the user 15 may visit a pharmacy's web site to have a prescription filled and delivered, a travel agent's web site to book a trip, a government agency's web site to renew a license, etc.

In some embodiments, behaviors of the user 15 may be measured and analyzed by the security system 14. For instance, the online systems 12 and 13 may report, to the security system 14, behaviors observed from the user 15. Additionally, or alternatively, the user devices 11A-C may report, to the security system 14, behaviors observed from the user 15. As one example, a web page downloaded from the web site hosted by the online system 13 may include software (e.g., a JavaScript snippet) that programs the browser running on one of the user devices 11A-C to observe and report behaviors of the user 15. Such software may be provided by the security system 14 and inserted into the web page by the online system 13. As another example, an application running on one of the user devices 11A-C may be programmed to observe and report behaviors of the user 15. The behaviors observed by the application may include interactions between the user 15 and the application, and/or interactions between the user 15 and another application. As another example, an operating system running on one of the user devices 11A-C may be programmed to observe and report behaviors of the user 15.

It should be appreciated that software that observes and reports behaviors of a user may be written in any suitable language, and may be delivered to a user device in any suitable manner. For example, the software may be delivered by a firewall (e.g., an application firewall), a network operator (e.g., Comcast, Sprint, etc.), a network accelerator (e.g., Akamai), or any device along a communication path between the user device and an online system, or between the user device and a security system.

Although only one user (i.e., the user 15) is shown in FIG. 1A, it should be appreciated that the security system 14 may be programmed to measure and analyze behaviors of many users across the Internet. Furthermore, it should be appreciated that the security system 14 may interact with other online systems (not shown) in addition to, or instead of the online systems 12 and 13. In addition, by analyzing digital interactions involving many different users and many different online systems, the security system 14 can have a more comprehensive and accurate understanding of how the users behave. However, aspects of the present disclosure are not limited to the analysis of measurements collected from different online systems, as one or more of the techniques described herein may be used to analyze measurements collected from a single online system. Likewise, aspects of the present disclosure are not limited to the analysis of measurements collected from different users, as one or more of the techniques described herein may be used to analyze measurements collected from a single user.

Figure 1B:
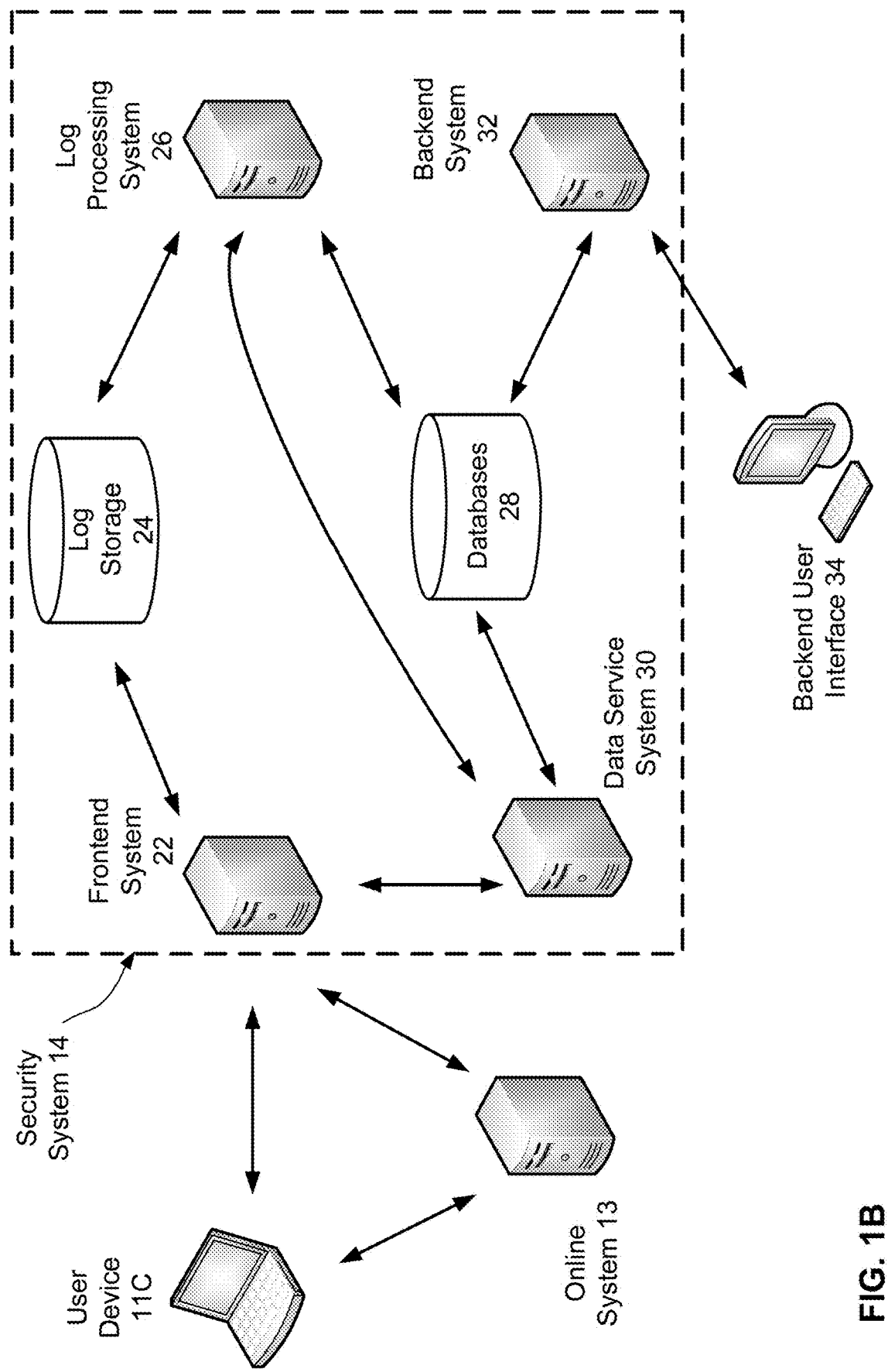
FIG. 1B shows an illustrative security system 14 for processing data collected from digital interactions, in accordance with some embodiments.

FIG. 1B shows an illustrative implementation of the security system 14 shown in FIG. 1A, in accordance with some embodiments. In this example, the security system 14 includes one or more frontend systems and/or one or more backend systems. For instance, the security system 14 may include a frontend system 22 configured to interact with user devices (e.g., the illustrative user device 11C shown in FIG. 1A) and/or online systems (e.g., the illustrative online system 13 shown in FIG. 1A). Additionally, or alternatively, the security system 14 may include a backend system 32 configured to interact with a backend user interface 34. In some embodiments, the backend user interface 34 may include a graphical user interface (e.g., a dashboard) for displaying current observations and/or historical trends regarding individual users and/or populations of users. Such an interface may be delivered in any suitable manner (e.g., as a web application or a cloud application), and may be used by any suitable party (e.g., security personnel of an organization).

In the example shown in FIG. 1B, the security system 14 includes a log storage 24. The log storage 24 may store log files comprising data received by the frontend system 22 from user devices (e.g., the user device 11C), online systems (e.g., the online system 13), and/or any other suitable sources. A log file may include any suitable information. For instance, in some embodiments, a log file may include keystrokes and/or mouse clicks recorded from a digital interaction over some length of time (e.g., several seconds, several minutes, several hours, etc.). Additionally, or alternatively, a log file may include other information of interest, such as account identifier, network address, user device identifier, user device characteristics, URL accessed, Stocking Keeping Unit (SKU) of viewed product, etc.

In some embodiments, a log processing system 26 may be provided to filter, transform, and/or route data from the log storage 24 to one or more databases 28. The log processing system 26 may be implemented in any suitable manner. For instance, in some embodiments, the log processing system 26 may include one or more services configured to retrieve a log file from the log storage 24, extract useful information from the log file, transform one or more pieces of extracted information (e.g., adding latitude and longitude coordinates to an extracted address), and/or store the extracted and/or transformed information in one or more appropriate databases (e.g., among the one or more databases 28).

In some embodiments, the one or more services may include one or more services configured to route data from log files to one or more queues, and/or one or more services configured to process the data in the one or more queues. For instance, each queue may have a dedicated service for processing data in that queue. Any suitable number of instances of the service may be run, depending on a volume of data to be processed in the queue.

The one or more databases 28 may be accessed by any suitable component of the security system 14. As one example, the backend system 32 may query the one or more databases 28 to generate displays of current observations and/or historical trends regarding individual users and/or populations of users. As another example, a data service system 30 may query the one or more databases 28 to provide input to the frontend system 22.

In some embodiments, the data service system 30 may include a plurality of data services (e.g., implemented using a service-oriented architecture). For example, one or more data services may access the one or more databases 28 periodically (e.g., every hour, every few hours, every day, etc.), and may analyze the accessed data and populate one or more first data sources used by the frontend system 22. Additionally, or alternatively, one or more data services may receive data from the log processing system 26, and may use the received data to update one or more second data sources used by the frontend system 22. Such a second data source may supplement the one or more first data sources with recent data that has arrived since the last time the one or more first data sources were populated using data accessed from the one or more databases 28. In various embodiments, the one or more first data sources may be the same as, or different from, the one or more second data sources, or there may be some overlap.

Although details of implementation are shown in FIG. 1B and discussed above, it should be appreciated that aspects of the present disclosure are not limited to the use of any particular component, or combination of components, or to any particular arrangement of components. Furthermore, each of the frontend system 22, the log processing system 26, the data service system 30, and the backend system 32 may be implemented in any suitable manner, such as using one or more parallel processors operating at a same location or different locations.

In some embodiments, improved techniques are provided for authenticating users who are interacting with online systems. For example, many users own a variety of network capable devices. Such devices may communicate with each other in a user's environment (e.g., the user's home, office, classroom, library, favorite coffee shop, or any other suitable environment). Examples of connected devices include, but are not limited to, desktop computers, laptop computers, and various smart devices such as watches, refrigerators, thermostats, garage door openers, light fixtures, washing machines, drones, sound systems, televisions, cable boxes, automobiles, and/or garments. As indicated above, in embodiments, a security system such as security system 14 may use information gathered about a user's environment to authenticate the user, for example, by verifying the presence of one or more devices that are expected to be in the user's environment.

In some embodiments, a security system such as security system 14 may generate and/or maintain an environment fingerprint associated with an environment in which a user operates. For instance, an environment fingerprint associated with the user's home may indicate one or more devices located in the user's home (e.g., by listing device types and/or device identifiers). Additionally, or alternatively, the environment fingerprint may indicate a network topology. For instance, the environment fingerprint may indicate connectivity among the one or more devices (e.g., whether device A is connected to device B) and/or connection types (e.g., device A is connected to device B via an Ethernet connection). As an example, the user may have a desktop computer that is connected to a keyboard via a Universal Serial Bus (USB) connection, and to a wireless router via a Wi-Fi connection. The wireless router may additionally be connected to an entertainment system via a Wi-Fi connection. The user may also have a mobile device (e.g., a smart phone) and a wearable device (e.g., a smart watch), which may be connected to each other via a Bluetooth connection.

Use of the precepts herein make it more challenging for an attacker to spoof a user's environment fingerprint with a high likelihood of success. For instance, it may be challenging for an attacker to know which devices are expected to be present in the user's environment, and/or how those devices are expected to be connected to each other. Therefore, by requiring that user devices submit environmental information and by verifying an environment fingerprint submitted by the device, the security system may increase a level of confidence that an entity purporting to be the user may indeed be the user, or at least be physically present in the user's environment. By managing the potential for partial matches (based on the availability or removal of devices from the environment), a partial fingerprint match may be considered weakly supportive of user identity.

Figure 2:
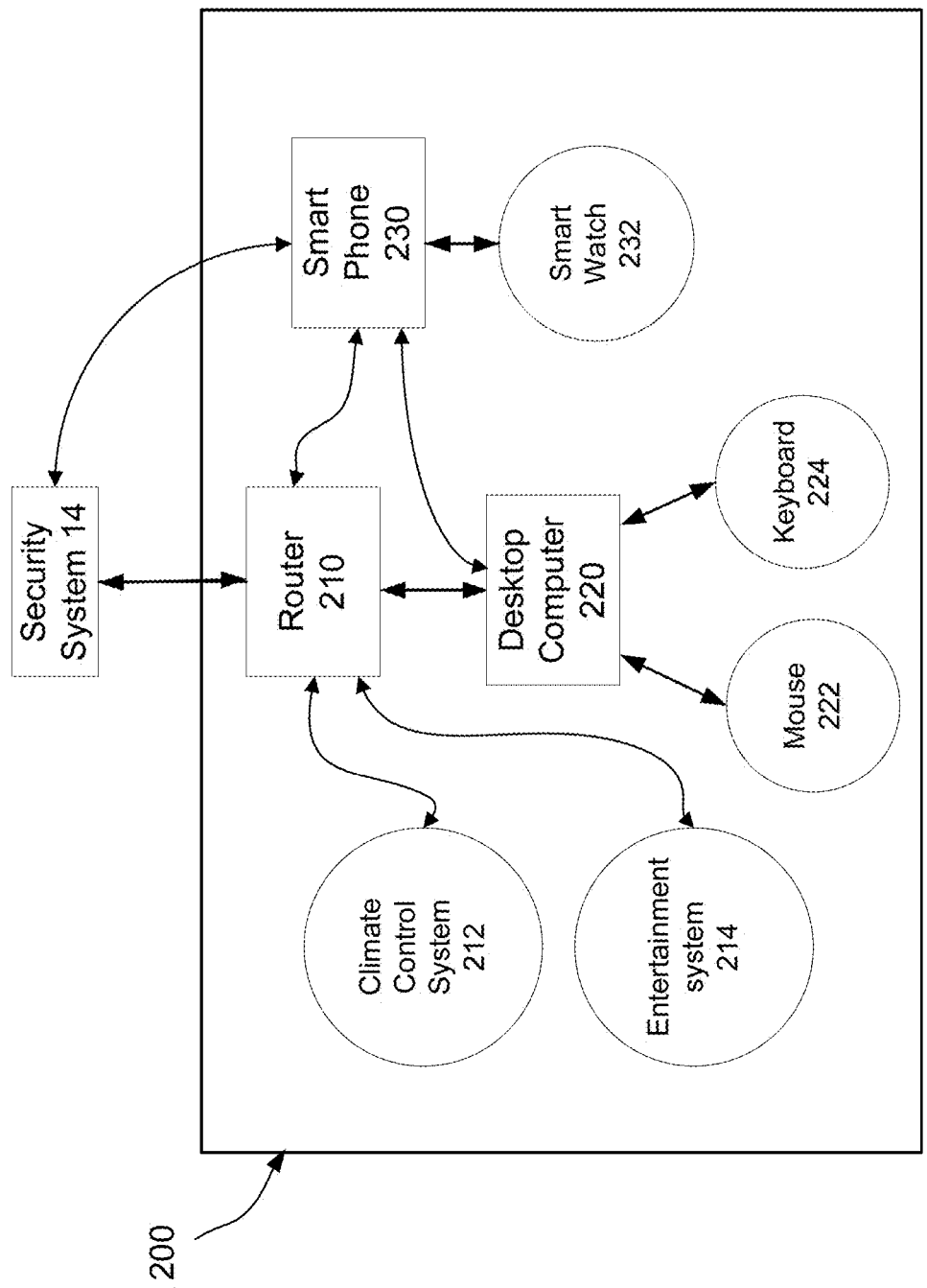
FIG. 2 shows an illustrative environment 200 associated with a user, in accordance with some embodiments.

FIG. 2 shows an illustrative environment 200 associated with a user, in accordance with some embodiments. In this example, the environment 200 is the user's home, with multiple network-capable devices arranged in an illustrative network topology. For instance, the environment 200 may include a router 210, a desktop computer 220, and a smart phone 230. A mouse 222 and a keyboard 224 may be connected to the desktop computer 220. A smart watch 232 may be connected to the smart phone 230, which in turn may be connected to the desktop computer 220. The desktop computer 220 and the smart phone 230 may be both connected to the router 210. The environment 200 may also include a climate control system 212 and an entertainment system 214, both of which may be connected to the router 210. It should be appreciated that these devices are shown in FIG. 2 and described herein solely for purposes of illustration, as aspects of the present disclosure are not limited to the use of any particular number or combination of devices. It should also be appreciated that the environment fingerprint of devices in the environment 200 may be associated with multiple end users (e.g., multiple members of the same family).

It should also be appreciated that the illustrative devices in the environment 200 may be connected in any suitable manner, for example, via wired or wireless connections. For instance, the mouse 222 and the keyboard 224 may be connected to the desktop computer 220 via USB cables, whereas each of the smart phone 230, the desktop computer 220, the climate control system 212, and the entertainment system 214 may be connected to the router 210 via a Wi-Fi connection. The smart watch 232 may be connected to the smart phone 230 using a low power and/or short range communications protocol, such as Bluetooth Low Energy (BLE). One or more other suitable networking technologies may also be used, as aspects of the present disclosure are not limited to any particular networking technology or combination of networking technologies.

In some embodiments, a security system (e.g., the illustrative security system 14 in the example of FIG. 1A) may deploy one or more software agents to collect information about the environment 200. The software agent may be downloaded and deployed as part or all of a native or web application on an Internet-enabled device. The collected information may be communicated to the security system 14, for example, via the router 210 and a cable network, the smart phone 230 and a cellular network, and/or any other device (e.g., a centralized IoT hub or an individual IoT device) with access to the Internet.

In some embodiments, the security system 14 may use information collected by the one or more software agents to generate an environment fingerprint for the environment 200. For instance, the environment fingerprint may include information indicative of one or more devices that are expected to be present in the environment 200. Additionally, or alternatively, the environment fingerprint may, for at least one first expected device, include information indicative of one or more second expected devices that are connected to the first expected device, and/or information indicative of respective connection types for the one or more second expected devices. As networked devices are frequently enabled to identify themselves to other devices on the local network, a fingerprint may be created from collected identifying information.

In some embodiments, an environment fingerprint may be updated whenever environmental changes occur which are confirmed to be within the same network. In some embodiments, changes to environment may not cause a fingerprint change, but may cause the addition of the newly-observed fingerprint to a collection of known environment fingerprints associated with the account. For example, separate home and workplace environment fingerprints can be maintained for the same account.

In some embodiments, the security system 14 may associate the environment fingerprint for the environment 200 with an identifier of the user (e.g., account identifier, user name, email address, phone number, credit card number, billing address, etc.), and may use the environment fingerprint for authentication during a future digital interaction. For instance, when an entity purporting to be the user initiates a digital interaction with an online system (e.g., the illustrative online system 12 or 13 in the example of FIG. 1A), the security system 14 may match the digital interaction to an environment fingerprint associated with the user. As an example, if the digital interaction is purportedly initiated through the desktop computer 220, the security system 14 may select the environment fingerprint generated for the environment 200, because the desktop computer 220 is known to exist in the environment 200 (which, in the example of FIG. 2, is the user's home).

In some embodiments, the security system 14 may determine whether one or more expected devices indicated in the environment fingerprint are indeed present. As an example, the security system 14 may identify a network device via which a device purporting to be the desktop computer 220 is connected to the Internet, and determine whether that network device is the router 210, for example by assessing the IP or MAC address of the network device. Additionally, or alternatively, the security system 14 may identify one or more other devices that are also connected to the network device, and determine whether any of the other devices is the climate control system 212, the entertainment system 214, or the smart phone 230. This identification is performed using a software agent, deployed within application software running on the desktop computer.

In some embodiments, the security system 14 may determine if the device purporting to be the desktop computer 220 is connected to, and/or within an expected proximity of, the smart phone 230 and/or the smart watch 232. This is assessed through the collection of data from the desktop computer 220, where data describes the available devices on the local network.

In some embodiments, the security system 14 may request that the device purporting to be the desktop computer 220 report information regarding one or more peripheral devices connected thereto. The security system 14 may compare the device's report against the environment fingerprint. For instance, the security system 14 may determine from the environment fingerprint that the desktop computer 220 is expected to be connected to the mouse 222 and the keyboard 224, and may check whether the device's report includes the mouse 222 and/or the keyboard 224. Additionally, or alternatively, the security system 14 may determine from the environment fingerprint that the desktop computer 220 is expected to be connected to a mouse and a keyboard via USB connections. If the device purporting to be the desktop computer 220 instead reports a mouse or a keyboard with a Bluetooth connection, the security system 14 may flag a potential spoofing attack.

In some embodiments, the security system 14 may determine from the environment fingerprint that the climate control system 212 is expected to be set at a certain value (e.g., 70° F.) at a certain time (e.g., during daytime). Accordingly, the security system 14 may poll the climate control system 212 to check that the temperature setting is as expected.

In some embodiments, the security system 14 may independently poll an expected device identified in the environment fingerprint, and may use information received from the expected device to authenticate an entity purporting to be the user. For instance, the security system 14 may receive sensor data (e.g., accelerometer data) from the smart watch 232, and match the sensor data to information (e.g., timed sequence of keystrokes) reported by the device purporting to be the desktop computer 220. If the accelerometer data from the smart watch 232 suggests the user's wrist is not moving, or is moving in a manner that is not consistent with the reported timed sequence of keystrokes, the security system 14 may flag a potential spoofing attack.

Figure 3:
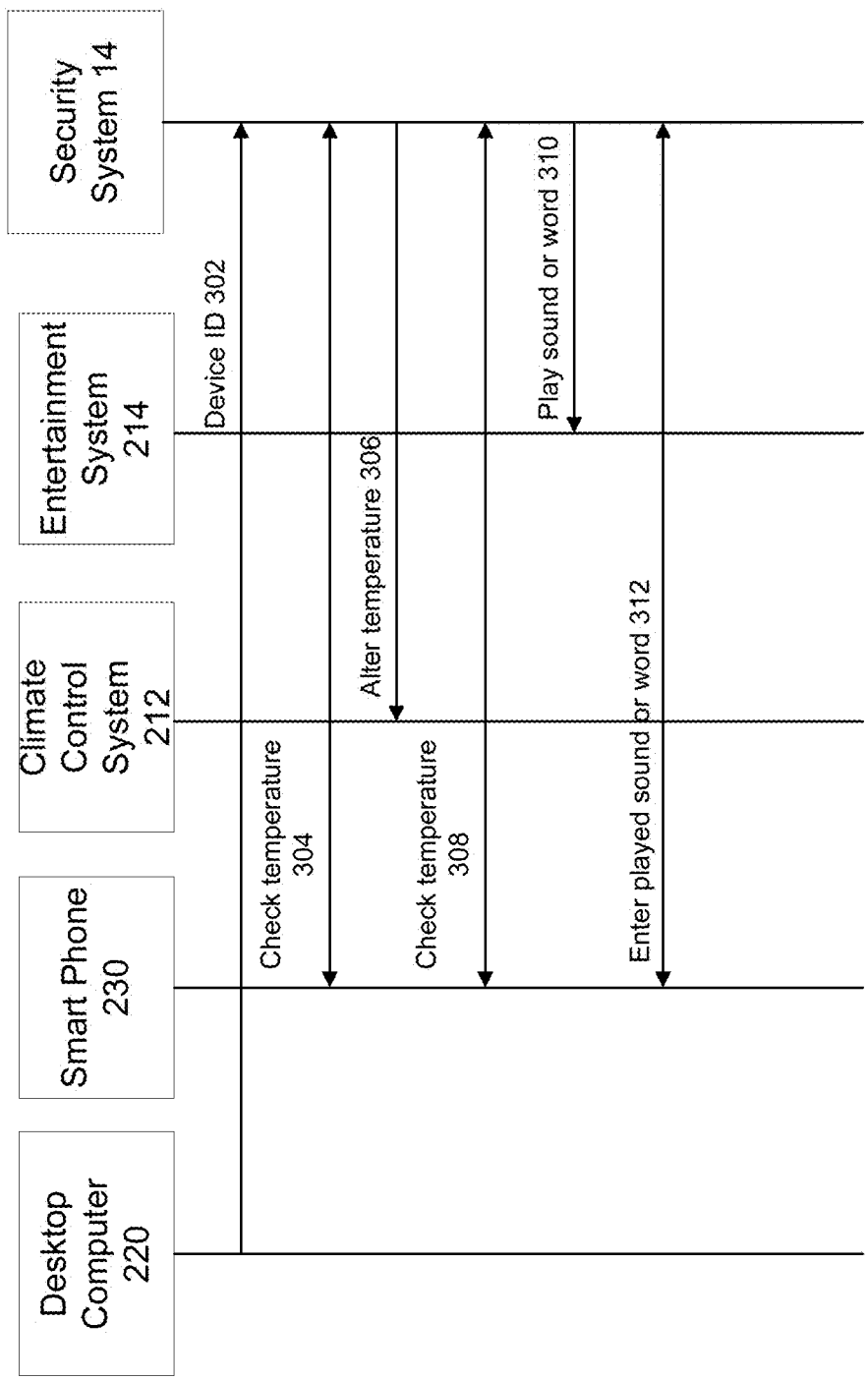
FIG. 3 shows an illustrative process 300 that may be carried out by a security system to dynamically probe one or more connected devices, in accordance with some embodiments.

As indicated, enhanced security may be provided by dynamically probing one or more connected devices that are expected to be present in a user's environment. For instance, in some embodiments, dynamic probing may be used to thwart an attacker's attempt to spoof an environment fingerprint. FIG. 3 shows an illustrative process 300 that may be carried out by a security system to dynamically probe one or more connected devices, in accordance with some embodiments. For instance, the process 300 may be performed by the illustrative security system 14 in the example of FIGS. 1A-B and the illustrative desktop computer 220, the illustrative smart phone 230, the illustrative climate control system 212, and the illustrative entertainment system 214 in the example of FIG. 2.

In some embodiments, the security system 14 may perform passive authentication during a digital interaction, for example, by surreptitiously polling a connected device that is expected to be in the user's environment. This can make a spoofing attack more difficult, because an attacker may not even know that polling is taking place, much less which device is being polled. Even if the attacker is aware of the polling, the attacker may not be able to hijack a communication session that is independently established between the security system 14 and the device that is being polled.

For instance, in the example of FIG. 3, an entity purporting to be the user may access a web application or otherwise initiate a digital interaction with an online system (e.g., the illustrative online system 12 or 13 in the example of FIG. 1A). At act 302, information regarding the digital interaction may be communicated to the security system 14, such as an identifier of a device used by the entity to initiate the digital interaction. This information may be communicated to the security system 14 directly, or via the online system 12 or 13. If the entity is indeed the user, and the device used to initiate the digital interaction is indeed a device in the user's environment (e.g., the desktop computer 220), the device may provide accurate information. However, if the entity is an attacker, or a bot controlled by the attacker, the device may provide false information. For instance, the device may provide a device identifier (e.g., a media access control, or MAC, address) of the desktop computer 220, instead of its own device identifier.

In some embodiments, to determine whether the digital interaction is indeed initiated from the desktop computer 220, the security system 14 may identify an environment fingerprint associated with the desktop computer 220. For instance, the security system 14 may use an identifier of the user to identify one or more environment fingerprints associated with the user identifier, and may select therefrom an environment fingerprint comprising the device identifier of the desktop computer 220. The security system may then use the selected environment fingerprint to identify one or more other devices (e.g., the smart phone 230, the climate control system 212, and/or the entertainment system 214) that are expected to be in the same environment as the desktop computer 220.

In some embodiments, the security system 14 may, at act 304, poll one or more of the other devices that are expected to be in the same environment as the desktop computer 220. For instance, the security system 14 may request that the smart phone 230 check a current temperature setting at a thermostat associated with the climate control system 212, and report the setting value back to the security system 14. The security system 14 may check if the reported setting value is consistent with previously stored information (e.g., historical temperature setting values for a similar time of day, or a heating/cooling schedule currently in force). This check by the security system 14 may be used to authenticate the user to determine whether anything significant has changed with the connected devices to the personal area network. For example, a security system may ping security devices connected to the personal area network to check battery levels of all the individual sensors and check to see if any of the security devices are open/closed/disconnected. In response to the user's device determining that the security system's ping indicates a number of devices have been disconnected, then the user's device may be used to request a strong consumer authentication (SCA).

In some embodiments, the security system 14 may perform active authentication, in addition to, or instead of, passive authentication. For instance, the security system 14 may attempt to induce one or more changes in the user's environment, and verify that the one or more changes have actually occurred. As an example, at act 306, the security system 14 may send a command to the climate control system 212 to alter a temperature setting (e.g., increasing or decreasing the temperature setting by at least one degree) at the thermostat associated with the climate control system 212. At act 308, the security system 14 may send a command to the smart phone 230 to check the current temperature setting at the thermostat associated with the climate control system 212, and report the setting value back to the security system 14. Additionally, or alternatively, the security system 14 may prompt the entity purporting to be the user to check the current temperature setting at the thermostat associated with the climate control system 212, and report the setting value back to the security system 14. This may be done by sending a request to the device purporting to be the desktop computer 220, either directly or indirectly (e.g., via the online system 12 or 13). If the reported value at act 308 does not match the set value at act 306, the security system 14 may flag a potential spoofing attack.

The flag is used to ensure that all of these devices are in fact bound to the correct personal area network and ensure that all of these devices in fact belong to the right person. For example, if a user has a personal area network that includes a Wi-Fi thermostat, when the user completes an action that leverages the personal area network (PAN), a method to authenticate the user may request a current temperature setting of the Wi-Fi thermostat. Additionally, the system may adjust the thermostat by a certain amount and only the person who has access to that thermostat would be able to report the adjustment. This adjustment reporting also authenticates that the user has access to the user's thermostat and indicates that someone is not attempting to spoof the user.

As another example, the security system 14 may, at act 310, send a command to the entertainment system 214 to play a certain sound or word. At act 312, the security system 14 may send a request to the device purporting to be the desktop computer 220, either directly or indirectly (e.g., via the online system 12 or 13), to prompt the entity purporting to be the user to identify the sound or word played by the entertainment system 214. If the identified sound or word at act 312 does not match the played sound or word at act 310, the security system 14 may flag a potential spoofing attack.

In some embodiments, the security system 14 may request that the entity purporting to be the user perform an action that may only be performed from the user's environment. For instance, the entity may be requested to turn a certain light switch on and off physically, and the security system 14 may check data received from the light switch to confirm that the entity indeed has access to the user's environment. Additionally, or alternatively, the security system 14 may check data received from another device (e.g., a device that is in a same room and has a light sensor) to confirm that a corresponding light indeed went on and off.

It should be appreciated that one or more of the techniques shown in FIG. 3 and described above may be used check not only that an entity purporting to be the user is physically present in an environment associated with the user, but also that the entity has access to one or more devices that are known to exist in that environment, thereby providing a high level of confidence that the entity is indeed the user.

It should also be appreciated that the communications shown in FIG. 3 are provided solely for purposes of illustration, as other forms of communications may also be suitable (e.g., with different types of devices and/or different requested actions). Any communication with any device, and/or between two or more devices, in a user's environment may be initiated and/or analyzed to authenticate the user. For instance, in response to an entity attempting to log in to a user's account at a web site, the security system 14 may perform a dynamic knowledge-based authentication process. As an example, one or more known devices in the user's environment may be listed along with some fictitious devices (e.g. Kitchen Light, Kitchen Fridge, Range Light, Water Feature, Main Entrance Light, Main Entrance Lock, etc.). The security system 14 may prompt the entity to select one or more smart devices that are in the user's environment. Additionally, or alternatively, a status of a particular device may be shown, and the entity may be prompted to indicate whether the status is correct or incorrect. For instance, the entity may be prompted to indicate whether each of the Kitchen Light, the Range Light, and the Main Entrance Light is on or off.

In some embodiments, the security system 14 may perform active and/or passive NFC and/or RFID verification. For instance, active NFC and/or RFID verification may be performed by prompting a user to place his/her credit card sufficiently close to his/her smart phone to demonstrate that the user is in possession of both devices. In some embodiments, the smart phone may include an NFC and/or RFID reader configured to initiate a communication session with the credit card.

In these embodiments, if the active NFC and/or RFID verification is completed, then this would have a positive impact on the confidence score associated with the authentication of the user. Alternatively, in these embodiments, if the active NFC and/or RFID verification is not completed, then this would have a negative impact on the confidence score associated with the authentication of the user. Put simply, if the user passes the active NFC and/or RFID verification, a score of confidence regarding the authentication of the user goes up, and if the user does not pass the active NFC and/or RFID verification, a score of confidence regarding the authentication of the user goes down.

In some embodiments, passive NFC and/or RFID verification may be performed by passively scanning for nearby NFC and/or RFID capable devices (e.g., credit cards), and using information collected to provide a risk assessment. For example, if an entity attempts to log into a web site as John Smith via a user device, the security system 14 may cause the user device to scan for nearby NFC and/or RFID capable devices. If a software agent deployed to the user device discovers multiple payment cards associated with John Smith, the security system 14 may determine that the login attempt is low risk. If the user device discovers a large number of payment cards, or payment cards associated with multiple different names, the security system 14 may determine that the login attempt is high risk (e.g., a criminal cycling stolen credit cards). A high level of risk decreases the desire to proceed with whatever event is happening (i.e., payment or access to an account). For example, in the event the software agent discovers that via NFC/RFID there are 100 cards nearby with different names, then the software agent deems the transaction as "high risk" and should be denied.

In some implementations, the security system 14 may be configured to perform passive verification first. If the passive verification indicates a high risk, active validation may be triggered. In other words, the security system 14 prefers to leverage the ability to passively identify/authenticate the user when the security system 14 detects the same device, the same personal area network, the same devices on the personal area network fall within a normal history of information, or other suitable information with respect to the personal area network. In this case, the security system 14 determines there is no need to perform strong consumer authentication (SCA). However, when the security system 14 identifies any level of uncertainty with respect to the identification/authentication of the user, then the security system 14 may perform SCA by invoking an increase of the Wi-Fi thermostat and request the user to validate the change in temperature or the current temperature. Put simply, the passive system notices some uncertainty as there are new devices and some devices removed, so active SCA authentication is invoked.

It should be appreciated that the techniques described herein may be applied to any suitable combination of devices with NFC and/or RFID capability, in addition to, or instead of, payment cards and smart phones. Furthermore, one or more other proximity-based technologies may be used in addition to, or instead of, NFC and RFID.

Figure 4:
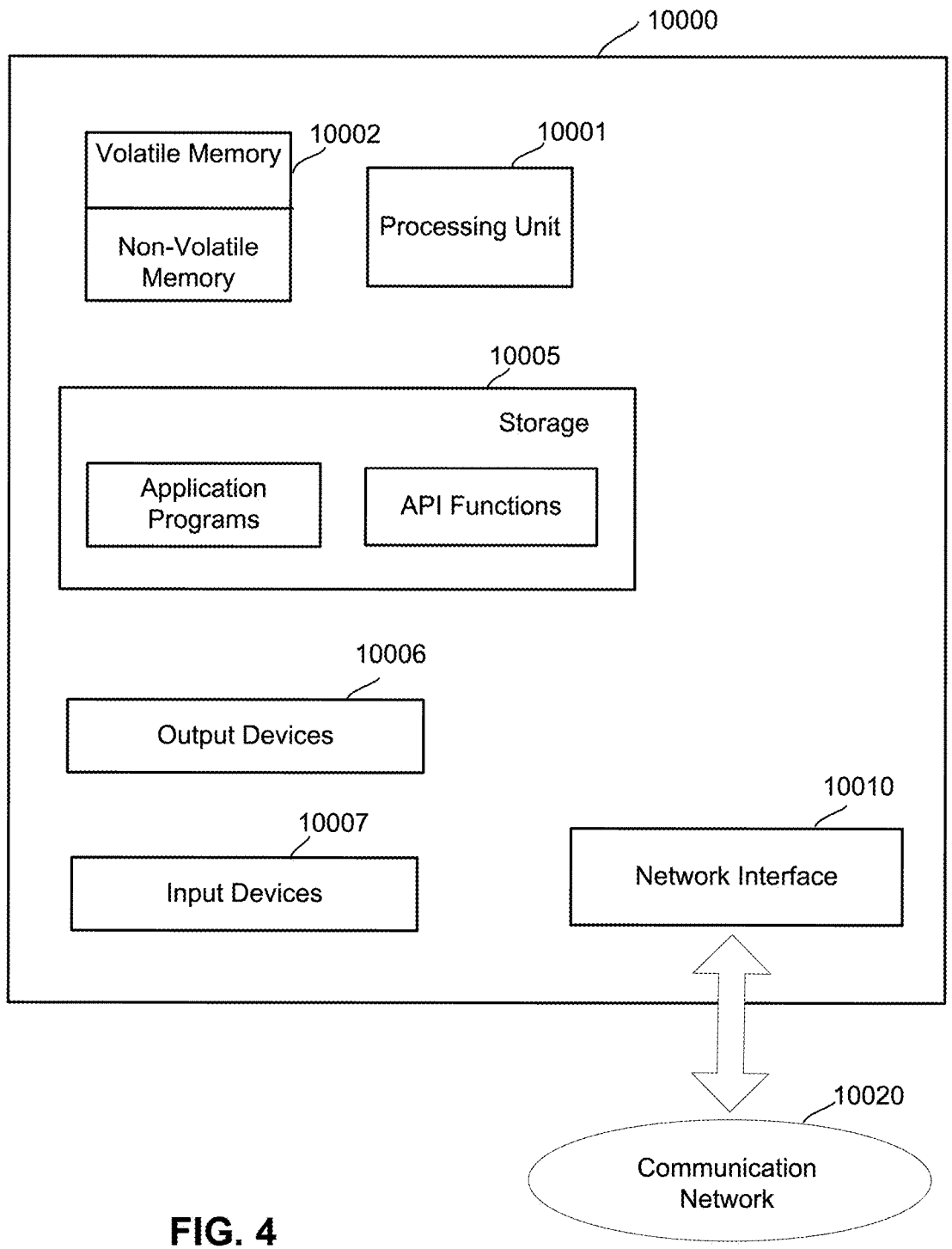
FIG. 4 shows, schematically, an illustrative computer 1000 on which any aspect of the present disclosure may be implemented.

FIG. 4 shows, schematically, an illustrative computer 10000 on which any aspect of the present disclosure may be implemented. In the embodiment shown in FIG. 4, the computer 10000 includes a processing unit 10001 having one or more processors and a non-transitory computer-readable storage medium 10002 that may include, for example, volatile and/or non-volatile memory. The memory 10002 may store one or more instructions to program the processing unit 10001 to perform any of the functions described herein. The computer 10000 may also include other types of non-transitory computer-readable medium, such as storage 10005 (e.g., one or more disk drives) in addition to the system memory 10002. The storage 10005 may also store one or more application programs, one or more external components used by application programs (e.g., software libraries), and/or one or more operating systems, which may be loaded into the memory 10002.

The computer 10000 may have one or more input devices and/or output devices, such as devices 10006 and 10007 illustrated in FIG. 4. These devices can be used, among other things, to present a user interface. Examples of output devices that can be used to provide a user interface include printers or display screens for visual presentation of output and speakers or other sound generating devices for audible presentation of output. Examples of input devices that may be used for a user interface include keyboards and pointing devices, such as mice, touch pads, and digitizing tablets. As another example, the input devices 10007 may include a microphone for capturing audio signals, and the output devices 10006 may include a display screen for visually rendering, and/or a speaker for audibly rendering, recognized text.

As shown in FIG. 4, the computer 10000 may also include one or more network interfaces (e.g., the network interface 10010) to enable communication via various networks (e.g., the network 10020). Examples of networks include a local area network or a wide area network, such as an enterprise network or the Internet. Such networks may be based on any suitable technology and may operate according to any suitable protocol and may include wireless networks or wired networks (e.g., copper wire, fiber optic, etc.).

In some embodiments, the computer 10000 is operable to authenticate a user based on the information that is gathered actively and passively related to one or more devices associated with the user's device. The information can include any of the information gathered using the above-described techniques. After all of the information has been gathered or aggregated, the computer 10000 analyzes the information to assess whether enough information has been obtained to authenticate a user. The amount of information that is required to authenticate a user can vary depending upon the type of information that has been gathered. In some embodiments, a weighted distance measure or distribution can be used based on an observed set of devices (e.g., passive authentication) and/or device interactions (e.g., active authentication).

As an illustrative example, the weighted distribution that is used to authenticate a user looks to historical information regarding a user, the user's device, and the other devices that the user's device may be associated with. Based on this historical information, the more devices expected to be associated with the user's device that are actually associated with the user's device, the greater the confidence there will be in the authentication of the user. If, for example, a user is at home and the user's device is connected to the user's home WiFi network, the user's smart refrigerator, smart watch, and smart lightbulbs that are usually connected through the user's home WiFi network are all expected to be currently connected through the user's home WiFi network. If one of these devices is not connected through the network, there will be less confidence in the authentication of the user. However, each device can have a different weighted value associated with it. For example, perhaps the user's smart watch is regularly not connected through the user's home WiFi network. Instead, the smart watch often is only connected via Bluetooth to the user's device. In such an instance, the absence of the smart watch on the user's home WiFi network carries relatively little weight on the user's authentication. The user's device could also detect the presence of the smart watch based on the Bluetooth connection to the user's device, which could then increase the confidence in the user's authentication.

Similarly, if the user's same model of smart refrigerator has been detected being connected to the user's home WiFi network each day for the past two years, the smart refrigerator can have a large weight associated with its identification in the environmental fingerprint of the user's device. Alternatively, if the smart refrigerator is not detected on the user's home WiFi network, the large weight associated with the smart refrigerator works against authenticating the user.

The smart lightbulbs connected through the user's home WiFi network may have a similar large weight associated with their presence on the user's WiFi network due to a long past of identifying the specific model of smart lightbulbs on the home WiFi network. However, the light bulbs can provide an additional weight through active authentication. For example, the user's device could instruct a smart lightbulb to turn ON. When the smart lightbulb turns ON, a signal can be transmitted through the user's WiFi network to confirm that the smart lightbulb was turned ON. When such an action is completed, the weight associated with the presence of the smart lightbulb on the network can be increased to increase the confidence in the authentication of the user. If, for example, the smart lightbulb is detected on the user's WiFi network but the active authentication techniques do not work (e.g., after having worked in the past), the confidence in the authentication of the user can be reduced.

Additionally, Bluetooth strength, numbers of devices in network, number of devices actively connected to network, date of when one or more devices were last used, date of when one or more devices are connected to network, open/closed security sensors, or other suitable personal area network information may be used for authentication of the user. All this different information may be used from a passive perspective. For example, the user's personal area network (PAN) looks similar to what it always has, however when an active SCA is necessary, then changing the user's thermostat from 74 to 68 degrees Fahrenheit and requesting the user to validate the change may be performed. In another example, the user may set the Wi-Fi thermostat at 71 in the evening and 74 in the daytime during summer months. When the security system detects that the Wi-Fi thermostat has deviated from this pattern, i.e., the low is set at 76 in the evening and 80 in the daytime during a summer month, then the security system determines that the user may not be the same as the previous occupant.

When attempting to authenticate a user, the differences between what devices the user's device is expected to be associated with or is expected to be able to communicate with can determine whether the user is able to be authenticated. In some embodiments, each device is assigned a numerical weight value (e.g., on a scale of 0 to 100). The more frequently the device has been identified and the longer the history of the device being identified, the higher the numerical weight value will be. After each device associated with the user's device has been identified and their numerical weight values determined, the numerical weight values can be summed, averaged, etc., so the aggregate of all the information gathered in relation to the authentication of the user can be compared to a single numerical value (e.g., a threshold sum, a threshold average, etc.).

Additionally, each user can have a plurality of profiles that correspond to different aspects of the user's life so the user can be authenticated when the user is, for example, at work, at his/her favorite coffee shop, etc. For each profile, a different grouping of devices or device interactions can be expected, and the same device can have different numerical weight values with respect to different profiles. The procedure described above with respect to the user's home network can be similarly applied to the user's other profiles (e.g., work). The use of a numerical weighted value for devices and user authentication has been provided as an illustrative example of one technique consistent with the embodiments described herein for authenticating a user. Other techniques can also be used with the embodiments described herein for authentication a user.

Figure 5:
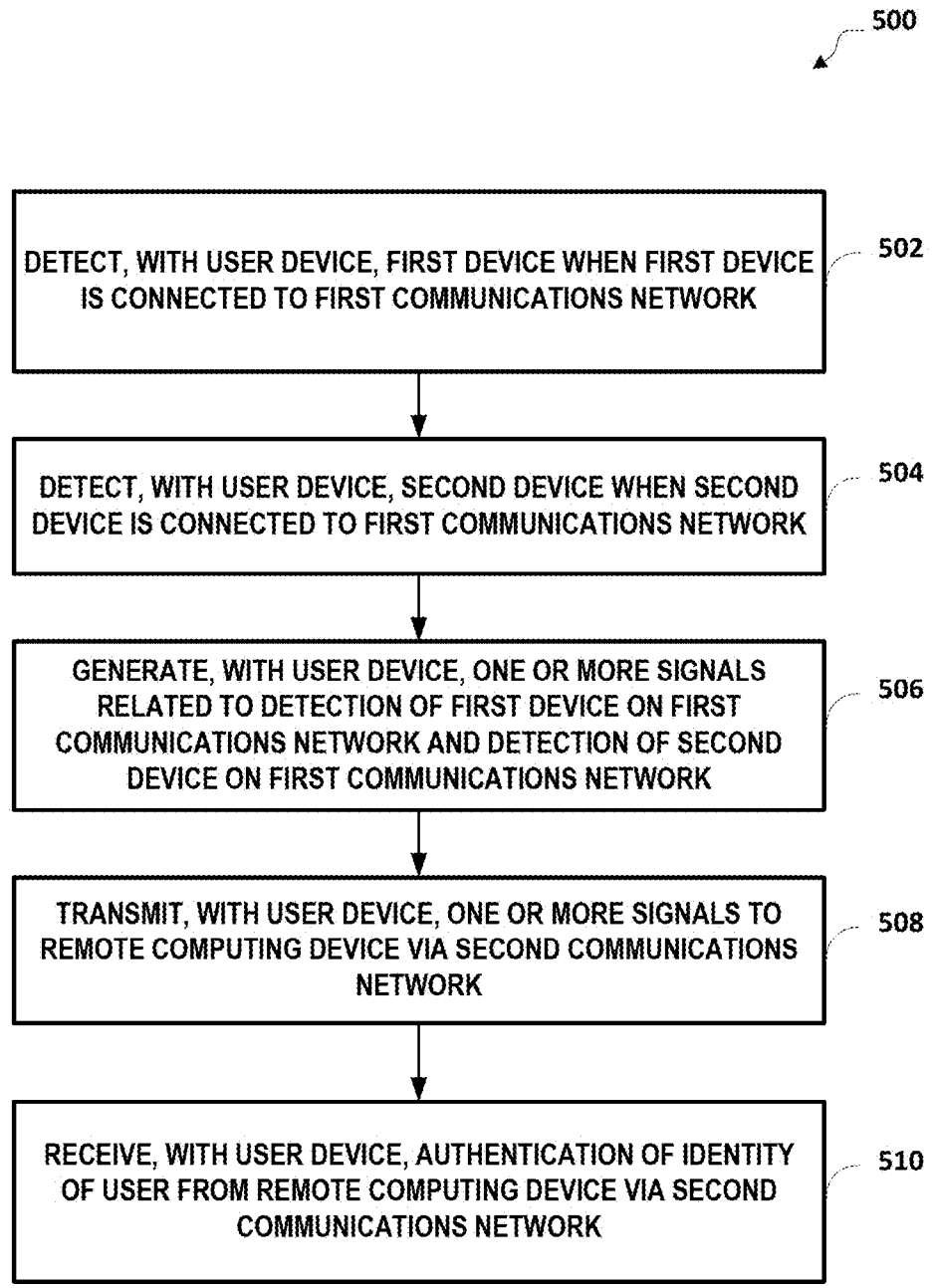
FIG. 5 is a process for authenticating an identity of a user, in accordance with some embodiments.

FIG. 5 is a process for authenticating an identity of a user, in accordance with some embodiments. FIG. 5 is described with respect to FIGS. 2 and 3.

The method 500 includes detecting, with a user device, a first device when the first device is connected to a first communications network (at block 502). For example, the smartphone 230 detects the smart watch 232 when the smart watch 232 is connected to a Bluetooth® network.

The method 500 also includes detecting, with the user device, a second device when the second device is connected to the first communications network (at block 504). For example, the smartphone 230 detects the desktop computer 220 when the desktop computer 220 is connected to the Bluetooth® network.

The method 500 also includes generating, with the user device, one or more signals related to the detection of the first device on the first communications network and the detection of the second device on the first communications network (at block 506). For example, the smartphone 230 generates one or more signals related to the detection of the smart watch 232 on the Bluetooth® network and the detection of the desktop computer 220 on the Bluetooth® network.

The method 500 also includes transmitting, with the user device, the one or more signals to a remote computing device via a second communications network (at block 508). For example, the smartphone 230 transmits the one or more signals to a cloud-based server via a Wi-Fi network.

The method 500 also includes receiving, with the user device, an authentication of the identity of user from the remote computing device via the second communications network (at block 510). For example, the smartphone 230 receives an authentication of the identity of user from the remote server via the Wi-Fi network.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only, and the following are non-limiting enumerated examples of the present disclosure.

Example 1: A system for authenticating an identity of a user, the system comprising: a first device of a first device type, the first device connected to and operable to communicate over a first communications network; a second device of a second device type, the second device connected to and operable to communicate over the first communications network; a user device connected to and operable to communicate over the first communications network, the user device also connected to and operable to communicate over a second communications network, the user device configured to detect the first device when the first device is connected to the first communications network, detect the second device when the second device is connected to the first communications network, and generate one or more signals related to the detection of the first device on the first communications network and the detection of the second device on the first communications network; and a remote computing device connected to and operable to communicate over the second communications network with the user device, the remote computing device configured to receive the one or more signals from the user device, the remote computing device configured to authenticate the identity of the user based on the one or more signals from the user device.

Example 2: The system of Example 1, wherein the user device is further configured to generate a request signal for the first device related to an action for the first device to complete, transmit the request signal to the first device over the first communications network, and detect whether the first device completed the action.

Example 3: The system of Example 2, wherein the action is one of a home automation task or a proximity task.

Example 4: The system of Example 3, wherein the first device is a smart thermostat, and wherein the home automation task is a modification of a setting of the smart thermostat.

Example 5: The system of Example 3, wherein the first device is a smart light bulb, and wherein the proximity task is turning ON and OFF the smart light bulb.

Example 6: The system of any of Examples 1 through 5, wherein the user device is further configured to generate a user prompt related to an action for the first device to complete, prompt a user of the user device to perform the action, and detect whether the first device completed the action.

Example 7: The system of any of Examples 1 through 6, wherein the second device is one or more devices selected from a group consisting of: a smart refrigerator, a smart television, a smart thermostat, and a smart lightbulb.

Example 8: A method for authenticating an identity of a user, the method comprising: detecting, with a user device, a first device when the first device is connected to a first communications network; detecting, with the user device, a second device when the second device is connected to the first communications network; generating, with the user device, one or more signals related to the detection of the first device on the first communications network and the detection of the second device on the first communications network; transmitting, with the user device, the one or more signals to a remote computing device via a second communications network; and receiving, with the user device, an authentication of the identity of the user from the remote computing device via the second communications network.

Example 9: The method of Example 8, further comprising: generating a request signal for the first device related to an action for the first device to complete; transmitting the request signal to the first device over the first communications network; and detecting whether the first device completed the action.

Example 10: The method of Example 9, wherein the action is one of a home automation task or a proximity task.

Example 11: The method of Example 10, wherein the first device is a smart thermostat, and wherein the home automation task is a modification of a setting of the smart thermostat.

Example 12: The method of Example 10, wherein the first device is a smart light bulb, and wherein the proximity task is turning ON and OFF the smart light bulb.

Example 13: The method of any of Examples 8 through 12, further comprising: generating a user prompt related to an action for the first device to complete; prompting the user of the user device to perform the action; and detecting whether the first device completed the action.

Example 14: The method of any of Examples 8 through 13, wherein the second device is one or more devices selected from a group consisting of: a smart refrigerator, a smart television, a smart thermostat, and a smart lightbulb.

Example 15: A non-transitory computer-readable medium comprising instructions that, when executed by an electronic processor, cause the electronic processor to perform a set of operations, the set of operations comprising: detecting a first device when the first device is connected to a first communications network; detecting a second device when the second device is connected to the first communications network; generating one or more signals related to the detection of the first device on the first communications network and the detection of the second device on the first communications network; transmitting the one or more signals to a remote computing device via a second communications network; and receiving an authentication of an identity of a user from the remote computing device via the second communications network.

Example 16: The non-transitory computer-readable medium of Example 15, further comprising: generating a request signal for the first device related to an action for the first device to complete; transmitting the request signal to the first device over the first communications network; and detecting whether the first device completed the action.

Example 17: The non-transitory computer-readable medium of Example 16, wherein the action is one of a home automation task or a proximity task.

Example 18: The non-transitory computer-readable medium of Example 17, wherein the first device is a smart thermostat, and wherein the home automation task is a modification of a setting of the smart thermostat.

Example 19: The non-transitory computer-readable medium of Example 17, wherein the first device is a smart light bulb, and wherein the proximity task is turning ON and OFF the smart light bulb.

Example 20: The non-transitory computer-readable medium of any of Examples 15 through 19, further comprising: generating a user prompt related to an action for the first device to complete; prompting the user to perform the action; and detecting whether the first device completed the action.

Example 21: A computing device comprising: a network interface configured to interface with a first communications network and a second communications network, a memory, and an electronic processor configured to control the network interface to detect a first device connected to a first communications network, detect a second device connected to the first communications network, generate one or more signals related to the detection of the first device on the first communications network and the detection of the second device on the first communications network, transmit the one or more signals to a remote computing device via the second communications network, and receive an authentication of the identity of the user from the remote computing device via the second communications network.

Example 22: The computing device of Example 21, wherein the electronic processor is further configured to generate a request signal for the first device related to an action for the first device to complete, transmit the request signal to the first device over the first communications network, and detect whether the first device completed the action.

Example 23: The computing device of Example 22, wherein the action is one of a home automation task or a proximity task.

Example 24: The computing device of Example 23, wherein the first device is a smart thermostat, and wherein the home automation task is a modification of a setting of the smart thermostat.

Example 25: The computing device of Example 23, wherein the first device is a smart light bulb, and wherein the proximity task is turning ON and OFF the smart light bulb.

Example 26: The computing device of any of Examples 21 through 25, wherein the electronic processor is further configured to generate a user prompt related to an action for the first device to complete, prompt the user of the user device to perform the action, and detect whether the first device completed the action.

Example 27: The computing device of any of Examples 21 through 26, wherein the second device is one or more devices selected from a group consisting of: a smart refrigerator, a smart television, a smart thermostat, and a smart lightbulb.

The above-described embodiments and enumerated examples of the present disclosure may be implemented in any of numerous ways. For example, the embodiments may be implemented using hardware, software, or a combination thereof. When implemented in software, the software code may be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including the use of pointers, tags or other mechanisms that establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any suitable manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof, as well as additional items.

What is claimed is:

1. A system for authenticating an identity of a user, the system comprising:
   a first device of a first device type, the first device connected to and operable to communicate over a first communications network;
   a second device of a second device type, the second device connected to and operable to communicate over the first communications network;

a user device connected to and operable to communicate over the first communications network, the user device also connected to and operable to communicate over a second communications network, the user device configured to
   detect the first device when the first device is connected to the first communications network,
   detect the second device when the second device is connected to the first communications network, and
   generate one or more signals related to the detection of the first device on the first communications network and the detection of the second device on the first communications network; and
a remote computing device connected to and operable to communicate over the second communications network with the user device, the remote computing device configured to receive the one or more signals from the user device, the remote computing device configured to authenticate the identity of the user based on the one or more signals from the user device,
wherein the user device is further configured to
   generate a first request signal for the first device related to a home automation task for the first device to complete,
   transmit the first request signal to the first device over the first communications network, and
   detect whether the first device completed the home automation task,
wherein the authentication of the identity of the user is an alternative to multifactor authentication.

2. The system of claim 1, wherein the user device is further configured to
   generate a second request signal for the first device related to an action for the first device to complete,
   transmit the second request signal to the first device over the first communications network, and
   detect whether the first device completed the action.

3. The system of claim 2, wherein the action is a proximity task.

4. The system of claim 3, wherein the first device is a smart thermostat, and wherein the home automation task is a modification of a setting of the smart thermostat.

5. The system of claim 3, wherein the first device is a smart light bulb, and wherein the proximity task is turning ON and OFF the smart light bulb.

6. The system of claim 1, wherein the user device is further configured to
   generate a user prompt related to an action for the first device to complete,
   prompt the user of the user device to perform the action, and
   detect whether the first device completed the action,
wherein the user possesses the user device.

7. The system of claim 1, wherein the second device is one or more devices selected from a group consisting of:
   a smart refrigerator,
   a smart television,
   a smart thermostat, and
   a smart lightbulb.

8. A method for authenticating an identity of a user, the method comprising:
   detecting, with a user device, a first device when the first device is connected to a first communications network;
   detecting, with the user device, a second device when the second device is connected to the first communications network;
   generating, with the user device, one or more signals related to the detection of the first device on the first communications network and the detection of the second device on the first communications network;
   transmitting, with the user device, the one or more signals to a remote computing device via a second communications network;
   receiving, with the user device, an authentication of the identity of the user from the remote computing device via the second communications network, the authentication of the identity of the user based on the one or more signals that are transmitted;
   generating a first request signal for the first device related to a home automation task for the first device to complete;
   transmitting the first request signal to the first device over the first communications network; and
   detecting whether the first device completed the home automation task,
wherein the authentication of the identity of the user is an alternative to multifactor authentication.

9. The method of claim 8, further comprising:
   generating a second request signal for the first device related to an action for the first device to complete;
   transmitting the second request signal to the first device over the first communications network; and
   detecting whether the first device completed the action.

10. The method of claim 9, wherein the action is a proximity task.

11. The method of claim 10, wherein the first device is a smart thermostat, and wherein the home automation task is a modification of a setting of the smart thermostat.

12. The method of claim 10, wherein the first device is a smart light bulb, and wherein the proximity task is turning ON and OFF the smart light bulb.

13. The method of claim 8, further comprising:
   generating a user prompt related to an action for the first device to complete;
   prompting the user of the user device to perform the action; and
   detecting whether the first device completed the action.

14. The method of claim 8, wherein the second device is one or more devices selected from a group consisting of:
   a smart refrigerator,
   a smart television,
   a smart thermostat, and
   a smart lightbulb.

15. A non-transitory computer-readable medium comprising instructions that, when executed by an electronic processor, cause the electronic processor to perform a set of operations, the set of operations comprising:
   detecting a first device when the first device is connected to a first communications network;
   detecting a second device when the second device is connected to the first communications network;
   generating one or more signals related to the detection of the first device on the first communications network and the detection of the second device on the first communications network;
   transmitting the one or more signals to a remote computing device via a second communications network;
   receiving an authentication of an identity of a user from the remote computing device via the second communications network, the authentication of the identity of the user based on the one or more signals that are transmitted;

generating a first request signal for the first device related to a home automation task for the first device to complete;

transmitting the request signal to the first device over the first communications network; and detecting whether the first device completed the home automation task, wherein the authentication of the identity of the user is an alternative to multifactor authentication.

16. The non-transitory computer-readable medium of claim 15, further comprising:

generating a second request signal for the first device related to an action for the first device to complete;

transmitting the second request signal to the first device over the first communications network; and detecting whether the first device completed the action.

17. The non-transitory computer-readable medium of claim 16, wherein the action is a proximity task.

18. The non-transitory computer-readable medium of claim 17, wherein the first device is a smart thermostat, and wherein the home automation task is a modification of a setting of the smart thermostat.

19. The non-transitory computer-readable medium of claim 17, wherein the first device is a smart light bulb, and wherein the proximity task is turning ON and OFF the smart light bulb.

20. The non-transitory computer-readable medium of claim 15, further comprising:

generating a user prompt related to an action for the first device to complete;

prompting the user to perform the action; and detecting whether the first device completed the action.

* * * * *